United States Patent
Narnhammer et al.

(10) Patent No.: US 10,995,295 B2
(45) Date of Patent: May 4, 2021

(54) USE OF LUBRICANTS ON THE BASIS OF WATER-SOLUBLE, HIGH VISCOSITY POLYGLYCOLS

(71) Applicant: Klüber Lubrication München SE & Co. KG, Munich (DE)

(72) Inventors: Daniel Andreas Narnhammer, Manchester, NH (US); Stefan Seemeyer, Wolfratshausen (DE); Justin Koozer, Castle Rock, CO (US); Ari-Pekka Holm, Germering (DE)

(73) Assignee: Klüber Lubrication München SE & CO. KG, Munich (DE)

( * ) Notice: Subject to any disclaimer, the term of this patent is extended or adjusted under 35 U.S.C. 154(b) by 29 days.

(21) Appl. No.: 16/319,377

(22) PCT Filed: Sep. 20, 2017

(86) PCT No.: PCT/EP2017/001124
§ 371 (c)(1),
(2) Date: Jan. 21, 2019

(87) PCT Pub. No.: WO2018/054534
PCT Pub. Date: Mar. 29, 2018

(65) Prior Publication Data
US 2019/0276761 A1    Sep. 12, 2019

(30) Foreign Application Priority Data

Sep. 21, 2016 (DE) .......................... 102016011397.9
Sep. 1, 2017 (DE) .......................... 102017008234.0
Sep. 15, 2017 (DE) .......................... 102017008676.1

(51) Int. Cl.
*C10M 107/34* (2006.01)
*C10M 145/34* (2006.01)
(Continued)

(52) U.S. Cl.
CPC ........ *C10M 107/34* (2013.01); *C10M 145/34* (2013.01); *C10M 169/04* (2013.01);
(Continued)

(58) Field of Classification Search
CPC .......................... C10M 107/34; C10M 145/34
See application file for complete search history.

(56) References Cited

U.S. PATENT DOCUMENTS 4,452,712 A * 6/1984 Laemmle ............. C10M 145/34
508/495
5,151,205 A    9/1992 Culpon, Jr.
(Continued)

OTHER PUBLICATIONS

International Search Report corresponding to International application No. PCT/EP2017/001124, dated Dec. 1, 2017 (11 pages).
(Continued)

*Primary Examiner* — Ellen M Mcavoy
(74) *Attorney, Agent, or Firm* — Maginot, Moore & Beck, LLP

(57) ABSTRACT

The present invention relates to the use of lubricants on the basis of water-soluble, high-viscosity polyethylene glycols
(Continued)

A Test gear
B Transmission gears
1 Test pinion
2 Test wheel
3 Torsion test coupling
4 Load lever with weights
5 Preload clutch
6 Locking bolt
7 Temperature sensor
8 Electric motor for lubricating open gearing, which is for example used in rotary kilns and mills.

12 Claims, 1 Drawing Sheet

(51) Int. Cl.
  *C10M 169/04* (2006.01)
  *F16H 57/04* (2010.01)
  *F16H 57/02* (2012.01)
  *C10N 10/02* (2006.01)
  *C10N 10/04* (2006.01)
  *C10N 20/02* (2006.01)
  *C10N 20/04* (2006.01)
  *C10N 30/02* (2006.01)
  *C10N 30/06* (2006.01)
  *C10N 40/04* (2006.01)

(52) U.S. Cl.
  CPC ....... *F16H 57/04* (2013.01); *C10M 2201/061* (2013.01); *C10M 2201/062* (2013.01); *C10M 2207/021* (2013.01); *C10M 2207/026* (2013.01); *C10M 2207/12* (2013.01); *C10M 2207/288* (2013.01); *C10M 2209/1045* (2013.01); *C10M 2209/1055* (2013.01); *C10M 2209/1075* (2013.01); *C10N 2010/02* (2013.01); *C10N 2010/04* (2013.01); *C10N 2020/02* (2013.01); *C10N 2020/04* (2013.01); *C10N 2030/02* (2013.01); *C10N 2030/06* (2013.01); *C10N 2040/04* (2013.01); *F16H 2057/02069* (2013.01)

(56) References Cited

U.S. PATENT DOCUMENTS

| | | | |
|---|---|---|---|
| 6,387,854 B1* | 5/2002 | Sedelmeier | C10M 107/34 508/579 |
| 6,558,569 B1* | 5/2003 | Shannon | C10M 111/04 252/78.1 |
| 2005/0250654 A1 | 11/2005 | Randles et al. | |
| 2008/0312113 A1* | 12/2008 | Beatty | C10M 169/044 508/162 |
| 2010/0204075 A1* | 8/2010 | da Costa | C10M 111/02 508/579 |
| 2014/0323374 A1* | 10/2014 | Stephens | A61K 8/86 508/579 |
| 2015/0113859 A1* | 4/2015 | Voelkel | C10L 1/1985 44/351 |
| 2016/0251592 A1* | 9/2016 | Greaves | C08L 71/02 508/579 |
| 2017/0349850 A1* | 12/2017 | Lerasle | C10M 169/04 |
| 2019/0071616 A1* | 3/2019 | Broutin | C10M 135/18 |
| 2019/0078036 A1* | 3/2019 | Broutin | C10M 169/04 |
| 2019/0225907 A1* | 7/2019 | Kotnis | C10M 107/34 |
| 2019/0292477 A1* | 9/2019 | Goyal | C10M 107/34 |

OTHER PUBLICATIONS

Hankes, R. William, "The Selection and Application of Lubricants for Rotary KILN Girth Gears and Pinions," Cement Industry Technical Conference, Apr. 11, 2013 (9 pages).

* cited by examiner

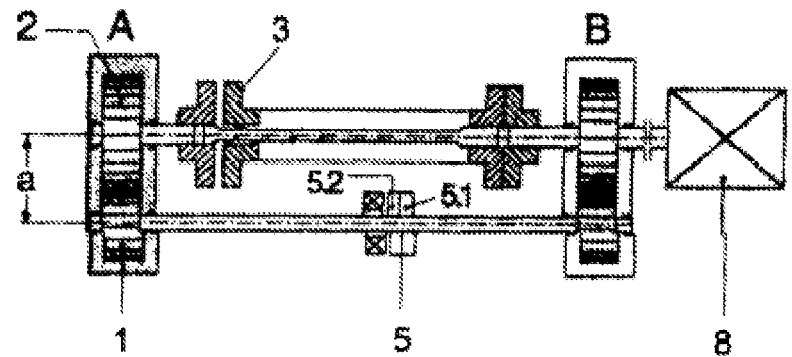
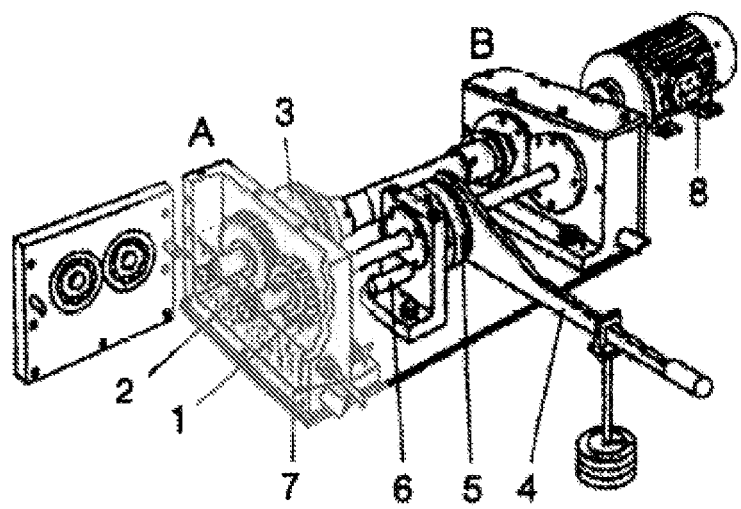
A  Test gear
B  Transmission gears
1  Test pinion
2  Test wheel
3  Torsion test coupling
4  Load lever with weights
5  Preload clutch
6  Locking bolt
7  Temperature sensor
8  Electric motor

USE OF LUBRICANTS ON THE BASIS OF WATER-SOLUBLE, HIGH VISCOSITY POLYGLYCOLS

This application is a 35 U.S.C. 371 National Stage application of PCT/EP2017/001124, filed Sep. 20, 2017, and claims priority to German Application No. DE 10 2016 011 397.9, filed on Sep. 21, 2016, and to German Application No. DE 10 2017 008 234.0 filed on Sep. 1, 2017, and to German Application No. DE 10 2017 008 676.1 filed on Sep. 15, 2017. The entire contents of the above-mentioned patent applications are incorporated herein by reference as part of the disclosure of this U.S. application.

The present invention relates to the use of lubricants based on water-soluble, high-viscosity polyglycols for lubrication of open transmission systems that are used, for example, in rotary furnaces, in mill drives, such as SAG (semi-autogenous grinding), or ball mills.

The development of novel lubricants has to accompany the general further development of technology that places new and higher demands on the lubricants. These demands lie in particular in the area of improvement of wear protection, lower lubricant consumption and hence also lower energy consumption.

In the field of use of open gear transmission systems for mills and rotary furnaces which are used, for example, in mining in the processing of iron ores, copper, nickel, zinc, bauxite and the like, in the production of fertilizers, in waste processing, in papermaking, in cement production, the lubricant has to ensure that the gears are coated with a separating, load-transmitting lubricant film. What is achieved thereby is that the metallic surfaces do not come into contact and hence no wear occurs either. The lubricant thus has to meet high demands with regard to high and low speeds, low friction, extremely long service lives, high loads, severe vibrations and long post-lubrication intervals.

In the case of large open transmission systems, there exist regions before and after the contact line (division line) in which there are states of limiting and mixed friction. In these regions, there is increased occurrence of high-area friction which leads to high wear and loss of energy and hence reduces the lifetime of the drive system.

WO 2015/063565 A1 describes a lubricant and a method of lubrication of mechanical devices; what is more particularly described is the lubrication of devices which are used in the processing of sugar cane. This lubricant composition is essentially water-insoluble since this is absolutely necessary for the applications described; this means that the composition has a water solubility of 0.5% by weight or less. The composition comprises a polyoxypropylene glycol polymer having a molecular weight of 5000 to 20 000 g/mol, a kinetic viscosity of 1200 to 20 000 cSt at 40° C., a viscosity index of not less than 230 and a degree of unsaturation of 0.05 meq/g or less, and antioxidants.

WO 2012/018463 A2 describes the use of high-viscosity poly-α-olefins which are used as a constituent of transmission oils for lubrication of rotary furnaces. These high-viscosity poly-α-olefins have high stability to shear forces.

It was an object of the present invention to provide a lubricant which meets the demands mentioned above and can be used in open gear transmission systems for rotary furnaces and mill drives, in the obtaining of minerals and ores, in the production of fertilizers, in waste processing, in papermaking and in cement production.

This object is surprisingly achieved by the use of high-viscosity, water-soluble polyglycols in a lubricant.

The term "polyglycol" (=polyalkylene oxide) is used as an umbrella term for homopolymers of ethylene oxide and propylene oxide and for copolymers of ethylene oxide and propylene oxide. The physical properties of the polyalkylene oxide are derived from their mode of preparation. They consist predominantly of branched polyethers which are prepared, for example, by polycondensation from glycols. They can also be synthesized by ring-opening polymerization of ethylene oxide or propylene oxide. Ethylene oxide polymers are started either with diol or alcohol; the propylene oxide polymers are started with a butyl alcohol. The copolymers of ethylene oxide and propylene oxide can be prepared in different compositions. The starters used are typically alcohols such as butanol, glycol, glycerol, but also water.

Polyglycol-based lubricants give a very low coefficient of friction, especially in the region of semi-fluid mixed friction. The high viscosity, the high viscosity index (VI) and EP/AW (extreme pressure/antiwear) additives ensure a sufficient film thickness on the gear surface and protection thereof.

Given the better coefficient of heat transfer of the polyglycol, it is expected that this will lead to a lower temperature in the region of the teeth, which can be regarded as direct evidence or a direct indicator for the lower friction loss and the higher efficiency of the transmission system.

Polyglycol oils also give good shear stability, which is important when open gear transmission systems under high load are used in rotary furnaces and mills. These and other effects can lead to a significantly longer service life of the oil when the lubrication is conducted via a dipping bath or by means of spray apparatus (extension of the spraying intervals, reduced lubricant consumption).

One of the most common methods of applying lubricants in the case of open transmission systems is what is called the spraying method by means of a pump and multiple nozzles. It is therefore essential that the lubricant has good sprayability.

The lubricant of the invention is sprayable and can be used immediately. Owing to its high viscosity index, it also has better sprayability at low temperatures. This leads to a larger temperature window in use compared to the known products. Furthermore, it is possible to dispense with the use of solvents and diluents.

For the present invention, it is possible to use water-soluble, high-viscosity polyalkylene polymers which are selected from the group consisting of polyethylene oxide, polyethylene oxide/polypropylene oxide. Water-soluble polymers (according to Römpp Lexikon der Chemie [Römpp's Lexicon of Chemistry], vol. 6, 10$^{th}$ edition, 1996) refer to those whose common feature is their solubility in water or aqueous media. A prerequisite for this is that these polymers have a sufficient number of hydrophilic groups for water solubility and are not crosslinked. The hydrophilic groups may be nonionic, anionic, cationic or zwitterionic, e.g. —OH, —COOH, —NH$_2$, —SH.

As already mentioned, the copolymers may be prepared from ethylene oxide and propylene oxide in different compositions. For example, there are those that have a ratio of 50:50 (1:1) of ethylene oxide and propylene oxide (compound 1), and those that have a ratio of 75:25 (3:1) of ethylene oxide and propylene oxide (compound 2). In the case of compound 1, the preparation process is started with a butyl compound, and ethylene oxide and propylene oxide are used in equal amounts. Compound 2 is started with water and is therefore a diol. Both compounds are water-soluble products. The higher the proportion of ethylene oxide, the more water can be absorbed by the lubricant. The compounds have different molecular weights, viscosities, viscosity indices and pour points. The copolymer compounds have lower pour points at higher molecular weights compared to the homopolymers. These copolymers also have higher viscosity indices compared to the polypropylene oxide polymers. Polyglycols are products that are very hydrolysis-resistant, but oxidation-sensitive at relatively high temperatures. Their chemical reactivity is determined by the terminal OH groups, which can be readily esterified (to polyethylene oxide esters) or etherified (to polyethylene oxide ethers) or reacted with isocyanates to give polyurethane. The physical properties of the water-soluble polyalkylene polymers are described in detail in "Synthetic Lubricants and High-Performance Functional Fluids", ed. by Ronald L. Shubkin, 1993, Marcel Dekker Inc. New York; chapter 4, p. 101 et seq.

For many applications, however, the water solubility of the polyalkylene glycols is critical. Thus, the copolymer compounds can precipitate out at temperatures of 100° C. or more. This loss of water solubility with rising temperature is referred to as cloud point. Lubricants based on high-viscosity polyglycols show excellent properties and give an adequate lubrication film to protect the teeth of the gears from metal-metal contacts, it being possible to reduce the occurrence of pitting and gray spotting on the metal surface.

The lubricant of the invention comprises a polyalkylene copolymer and additives.

The lubricant preferably comprises:
90% to 99% by weight of polyalkylene copolymer,
10% to 1% by weight of additives.

A particularly advantageous polyalkylene copolymer for the present invention was found to be one consisting of polyethylene oxide/polypropylene oxide in a ratio of 1:1 (compound 1), especially preferably in a ratio of 3:1 (compound 2).

The viscosities of compound 1 are in the range from 5 to 1500 cSt at 40° C. The molecular weights of compound 1 are in the range from 90 to 4000. The preferred compounds are started with a diol or water.

The viscosities of compound 2 are in the range from 90 to 54 000 cSt at 40° C. Preference is given to the compounds that have a viscosity of 450 to 18 000 cSt at 40° C., especially preferred compounds being those that have a viscosity of 1000 to 18 000 cSt at 40° C. The molecular weights of the preferred compounds are in the range from 980 to 20 000, particular preference being given to compositions having a molecular weight of 10 000. The preferred compounds are started with a diol or water.

A particularly preferred composition (composition 1) comprises:
98.7% by weight of polyethylene glycol/polypropylene glycol 3:1 having a viscosity of 17 850 cSt at 40° C. and a molecular weight of 15 000 and a pour point of 4,
1% by weight of phenolic antioxidant and
0.3% by weight of succinic monoester (carboxylic acid derivative) as anticorrosive.

The additives may be selected from the group consisting of antioxidants, anticorrosives, antiwear agents, pour point and viscosity index improvers, UV stabilizers and the like. A particularly preferred group of additives is that of those which are in solid form, which are insoluble in the base oils. In this case, preference is given to solids that do not have a marked color. White substances in particular are suitable here, such as boron nitride, and compounds based on phosphates, on carbonates and on carboxylates. Very particular preference is given to using alkali metal and alkaline earth metal salts of mono- and dicarboxylic acids.

In addition, the lubricant composition may also comprise further base oils selected from the group consisting of esters, mineral oils, synthetic hydrocarbons. In addition, it is possible to use water-insoluble polyglycols as a further base oil. Water-insoluble polyglycols may be random polymers (statistical copolymers) or block copolymers. These may contain ethylene oxide, propylene oxide, butylene oxide and THF units. Starters may be mono-, di- and polyfunctional alcohols. The ethylene oxide content is less than 50% (based on molar parts) or 1:1.

A preferred composition comprises:
70% to 98.5% by weight of polyethylene glycol/poly-propylene glycol 3:1,
0.5% to 20% by weight of water-insoluble polyglycol and
10% to 1% by weight of additives.

A further preferred composition comprises:
70% to 98.5% by weight of polyethylene glycol/poly-propylene glycol 1:1,
0.5% to 20% by weight of water-insoluble polyglycol and
10% to 1% by weight of additives.

Yet a further preferred composition comprises:
87% to 90% by weight of polyalkylene copolymer of compound 1 and/or 2,
10% to 1% by weight of additives and
3% to 0.1% by weight of alkali metal or alkaline earth metal salts of mono- and/or dicarboxylic acids.

In addition, a further preferred composition comprises:
87% to 90% by weight of polyalkylene copolymer of compound 1 and/or 2,
10% to 1% by weight of additives and
3% to 0.1% by weight of disodium sebacate.

Composition 1 was used to examine limiting stress in an open gear transmission system in order thus to ascertain the scuffing load stage and specific wear in mg/kWh. For this purpose, an FZG gear test rig was used, with which the antiwear characteristics of semifluid greases and lubricant oils and stress are examined, and hence conclusions can be drawn as to the scuffing load stage and wear.

FIG. 1 shows the FZG* test rig (* Gear Research Center, Technical University of Munich).

The test was conducted under the following test conditions:

Circumferential speed: 2.8 m/s

Sprocket speed: 500 rpm

Run time per load stage: 45 minutes

Driving test wheel: sprocket

Total motor revolutions per load stage: 21 700

Dip lubrication: oil sump temperature from load stage 4 (LS 4): 50° C.

Amount of test oil: about 1.25 L

Test result: scuffing load stage DIN ISO 14635-3-A/2.8/40-M: ><12

Pitting load torque $M_{test}$ 534.5 Nm

Change in weight based on work performed $\Delta M_s$ 0.0186 mg/kWh

Table 1 shows the results.

TABLE 1

| Load stage LS | Work W [kWh] | Mass of the sprocket After LS ms [g] | Change in ms [mg] Δ | Σ | Mass of the wheel After LS mw [g] | Change in mw [mg] Δ | Σ | Mass of sprocket and wheel Change in ms + w [mg] Δ | Σ |
|---|---|---|---|---|---|---|---|---|---|
| New | 0.19 | 730.021 | — | — | 1260.370 | — | — | — | — |
| 4 | 6.43 | 730.021 | 0 | 0 | 1260.370 | 0 | 0 | 0 | 0 |
| 5 | 11.80 | 730.021 | 0 | 0 | 1260.370 | 0 | 0 | 0 | 0 |
| 6 | 19.50 | 730.021 | 0 | 0 | 1260.370 | 0 | 0 | 0 | 0 |
| 7 | 29.90 | 730.021 | 0 | 0 | 1260.370 | 0 | 0 | 0 | 0 |
| 8 | 43.50 | 730.021 | 0 | 0 | 1260.370 | 0 | 0 | 0 | 0 |
| 9 | 60.80 | 730.021 | 0 | 0 | 1260.370 | 0 | 0 | 0 | 0 |
| 10 | 82.00 | 730.021 | 0 | 0 | 1260.370 | 0 | 0 | 0 | 0 |
| 11 | 107.70 | 730.021 | 0 | 0 | 1260.370 | 0 | 0 | 0 | 0 |
| 12 | 138.10 | 730.021 | 3 | 3 | 1260.370 | 3 | 3 | 6 | 6 |

It becomes clear from the results shown in table 1 that the wear/attrition on combination of the values for sprocket and wheel is 6 mg after load stage 12.

In order to show the advantages with regard to the low wear or relatively low attrition, the FZG test was conducted with a conventional lubricant composition. The lubricant contained a mineral oil and polyisobutylene and had a viscosity of 10 000 cSt at 40° C. The abovementioned parameters are also the basis of this FZG test.

The results are shown Table 2.

TABLE 2

| Load stage LS | Work W [kWh] | Mass of the sprocket After LS ms [g] | Change in ms [mg] Δ | Σ | Mass of the wheel After LS mw [g] | Change in mw [mg] Δ | Σ | Mass of sprocket and wheel Change in ms + w [mg] Δ | Σ |
|---|---|---|---|---|---|---|---|---|---|
| New | 0.19 | 728.362 | — | — | 1267.747 | — | — | — | — |
| 4 | 6.43 | 728.362 | 0 | 0 | 1267.747 | 0 | 0 | 0 | 0 |
| 5 | 11.80 | 728.362 | 0 | 0 | 1267.747 | 0 | 0 | 0 | 0 |
| 6 | 19.50 | 728.362 | 0 | 0 | 1267.747 | 0 | 0 | 0 | 0 |
| 7 | 29.90 | 728.362 | 0 | 0 | 1267.747 | 0 | 0 | 0 | 0 |
| 8 | 43.50 | 728.362 | 0 | 0 | 1267.747 | 0 | 0 | 0 | 0 |
| 9 | 60.80 | 728.362 | 0 | 0 | 1267.747 | 0 | 0 | 0 | 0 |
| 10 | 82.00 | 728.362 | 0 | 0 | 1267.747 | 0 | 0 | 0 | 0 |
| 11 | 107.70 | 728.362 | 0 | 0 | 1267.747 | 0 | 0 | 0 | 0 |
| 12 | 138.10 | 728.362 | 17 | 17 | 1267.747 | 14 | 14 | 31 | 31 |

By contrast with the lubricant composition of the invention, the friction/wear loss was 31 mg at load stage 12.

As already mentioned, open gear transmission devices are mainly lubricated by means of spray devices. Therefore, the lubricant has to have excellent sprayability. The excellent sprayability of the abovementioned lubricant composition of the invention was conducted at various temperatures and pump pressures. Table 3 shows the results.

TABLE 3

| Spray method | Temperature (° C.) | Pump pressure (bar) | Spray pattern* |
|---|---|---|---|
| fixed | 10 | 3 | — |
| fixed | 10 | 5 | — |
| fixed | 10 | 7 | OK |
| fixed | 25 | 3 | — |
| fixed | 25 | 5 | not determinable |
| fixed | 25 | 7 | good |
| fixed | 40 | 3 | not determinable |
| fixed | 40 | 5 | good |
| fixed | 40 | 7 | good |

*The spray pattern was determined visually.

It was thus shown that the lubricant composition of the invention has good sprayability.

The lubricant composition of the invention is used in open gear transmission systems for rotary furnaces and mills that are used in the obtaining of minerals and ores, in the production of fertilizers, in waste processing, in cement production or in papermaking.

The invention claimed is:

1. The use of a lubricant comprising:
   providing a lubricant comprising;
   90% to 99% by weight of a high-viscosity, water-soluble polyalkylene copolymer selected from the group consisting of (a) polyethylene oxide/polypropylene oxide in a ratio of 1:1 having a viscosity of 1000 to 1500 cSt at 40° C. and a molecular weight of 90 to 4000, and (b) polyethylene oxide/polypropylene oxide in a ratio of 3:1 having a viscosity in the range from 1000 to 54,000 cSt at 40° C. and a molecular weight in the range from 980 to 20,000, and
   10% to 1% by weight of one or more additives; and
   introducing the lubricant into an open gear transmission system for rotary furnaces and mills used in one or more of the obtaining of minerals and ores, in the production of fertilizers, in waste processing, in cement production and in papermaking.

2. The use as claimed in claim 1, wherein the one or more additives are selected from the group consisting of antioxidants, anticorrosives, antiwear agents, pour point improvers, viscosity improvers, and UV stabilizers.

3. The use as claimed in claim 1 wherein the one or more additives are selected from the group consisting of boron nitride, compounds based on phosphates, carbonates, carboxylates, and alkali metal and alkaline earth metal salts of mono- and dicarboxylic acids.

4. The use as claimed in claim 1, wherein the lubricant further comprises one or more selected from the group consisting of esters, mineral oils, synthetic hydrocarbons, water-insoluble polyglycols.

5. The use as claimed in claim 1, wherein the lubricant contains:
   98.7% by weight of polyethylene glycol/poly-propylene glycol in a ratio of 3:1 having a viscosity of 17,850 cSt at 40° C. and a molecular weight of 15,000 and a pour point of 4° C.;
   1% by weight of phenolic antioxidant; and
   0.3% by weight of succinic monoester as anticorrosive.

6. The use as claimed in claim 1, wherein the water-soluble polyalkylene copolymer is the polyethylene oxide/polypropylene oxide in a ratio of 3:1 having a viscosity in the range from 1000 to 18,000 cSt at 40° C. and a molecular weight in the range from 980 to 20,000.

7. A lubricant comprising:

90% to 99% by weight of a high-viscosity, water-soluble polyalkylene copolymer selected from the group consisting of polyethylene oxide/polypropylene oxide in a ratio of 1:1 having a viscosity of 1000 to 1500 cSt at 40° C. and a molecular weight of 90 to 4000, and polyethylene oxide/polypropylene oxide in a ratio of 3:1 having a viscosity in the range from 1000 to 54,000 cSt at 40° C. and a molecular weight in the range from 980 to 20,000; and 10% to 1% by weight of one or more additives.

8. The lubricant of claim 7, wherein the one or more additives are selected from the group consisting of antioxidants, anticorrosives, antiwear agents, pour point improvers viscosity improvers, and UV stabilizers.

9. The lubricant of claim 7, wherein the one or more additives are selected from the group consisting of boron nitride, compounds based on phosphates, carbonates, carboxylates, and alkali metal and alkaline earth metal salts of mono- and dicarboxylic acids.

10. The lubricant of claim 7, further comprising one or more base oils selected from the group consisting of esters, mineral oils, synthetic hydrocarbons, water-insoluble polyglycols.

11. The lubricant of claim 7, wherein the lubricant contains:

98.7% by weight of polyethylene glycol/poly-propylene glycol in a ratio of 3:1 having a viscosity of 17,850 cSt at 40° C. and a molecular weight of 15,000 and a pour point of 4° C.;

1% by weight of phenolic antioxidant; and 0.3% by weight of succinic monoester as anticorrosive.

12. The lubricant of claim 7, wherein the water-soluble polyalkylene copolymer is the polyethylene oxide/polypropylene oxide in a ratio of 3:1 having a viscosity in the range from 1000 to 18,000 cSt at 40° C. and a molecular weight in the range from 980 to 20,000.

* * * * *